United States Patent
Fujimoto et al.

(10) Patent No.: US 9,511,335 B2
(45) Date of Patent: Dec. 6, 2016

(54) MANUFACTURING METHOD OF ORGANIC-INORGANIC COMPOSITE MATERIAL AND OPTICAL MATERIAL

(71) Applicant: Konica Minolta, Inc., Tokyo (JP)

(72) Inventors: Shingo Fujimoto, Fussa (JP); Fumitaka Mochizuki, Mitaka (JP); Shinichi Hamaguchi, Hino (JP); Go Yamaguchi, Hachioji (JP); Yohei Ohno, Hino (JP); Ito Koga, Hino (JP); Naoko Uemura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/570,387

(22) Filed: Dec. 15, 2014

(65) Prior Publication Data

US 2015/0174609 A1    Jun. 25, 2015

(30) Foreign Application Priority Data

Dec. 20, 2013 (JP) ................. 2013-263701

(51) Int. Cl.
| | |
|---|---|
| *B05D 3/02* | (2006.01) |
| *B05D 7/00* | (2006.01) |
| *B32B 5/16* | (2006.01) |
| *B01J 2/00* | (2006.01) |
| *G02B 1/04* | (2006.01) |

(52) U.S. Cl.
CPC ............. *B01J 2/006* (2013.01); *G02B 1/04* (2013.01); *Y10T 428/2993* (2015.01); *Y10T 428/2998* (2015.01)

(58) Field of Classification Search
USPC ......... 428/403, 407, 328–330; 427/189, 203, 427/206
See application file for complete search history.

(56) References Cited

U.S. PATENT DOCUMENTS

| | | | | |
|---|---|---|---|---|
| 2010/0033826 | A1* | 2/2010 | Kolb et al. | ..... 359/599 |
| 2010/0119829 | A1* | 5/2010 | Karpov et al. | ..... 428/407 |

FOREIGN PATENT DOCUMENTS

| | | |
|---|---|---|
| JP | 55-118976 | 9/1980 |
| JP | 60-220358 A * | 11/1985 |
| JP | 60220358 A | 11/1985 |
| JP | 01-247473 | 10/1989 |
| JP | 11-116609 | 4/1999 |
| JP | 2000-044835 | 2/2000 |
| JP | 2005-213507 | 8/2005 |
| JP | 2005-232257 A | 9/2005 |
| JP | 2006-089523 A | 4/2006 |
| JP | 2007-113010 A | 5/2007 |
| JP | 2007-119769 A | 5/2007 |

(Continued)

OTHER PUBLICATIONS

Machine translation of JP 2005-213,507 (Sacripante et al), 2005.*
Machine translation of JP 60-220358 (1985).*

(Continued)

*Primary Examiner* — Holly Le
(74) *Attorney, Agent, or Firm* — Lucas & Mercanti, LLP

(57) ABSTRACT

A manufacturing method of an organic-inorganic composite material includes a flocculation and fusion step to flocculate and fuse composite particles in a liquid medium, the composite particles being formed by inorganic fine particles being coated by coating layers. In one embodiment, an average particle diameter of the inorganic fine particles is 1 nm or larger and 30 nm or smaller.

14 Claims, 1 Drawing Sheet

(56) References Cited

FOREIGN PATENT DOCUMENTS

| | | |
|---|---|---|
| JP | 2008-101049 A | 5/2008 |
| JP | 2009-084459 A | 4/2009 |

OTHER PUBLICATIONS

Office Action dated Sep. 1, 2015 issued from the corresponding Japanese patent application No. 2013-263701.
English translation of Office Action dated Sep. 1, 2015 issued from the corresponding Japanese patent application No. 2013-263701.
Office Action dated Apr. 12, 2016; Application No. 2013-263701; English translation of Office Action: Total of 10 pages.
Office Action dated Jun. 6, 2016 from the corresponding Chinese Application; Application No. 201410797426.4; Applicant: Konica Minolta, Inc.; English translation of Office Action; Total of 14 pages.

\* cited by examiner

MANUFACTURING METHOD OF ORGANIC-INORGANIC COMPOSITE MATERIAL AND OPTICAL MATERIAL

BACKGROUND OF THE INVENTION

1. Field of the Invention

The present invention relates to a manufacturing method of an organic-inorganic composite material and an optical material obtained by the manufacturing method.

2. Description of Related Art

In the field of organic-inorganic composite material, organic-inorganic composite materials wherein inorganic fine particles are dispersed in matrix of organic resin, so-called nano-composite materials, are receiving attentions since such materials can be expected to exhibit and improve various material properties such as mechanical strength, thermophysical property, gas permeability, optical property, etc.

As for a manufacturing method of such nano-composite materials, a composite method where inorganic fine particles are directly dispersed in a resin by Hot Melt Extrusion and a composite method (In-situ polymerization) where inorganic fine particles are dispersed in a polymerizable monomer for forming a resin and obtaining a resin through polymerization reaction under the existence of inorganic fine particles are suggested. The former is the major method for manufacturing polymer-clay nano-composite materials which are widely used industrially and the latter is suggested as a manufacturing method of, for example, silica/nylon nano composite materials, clay/polyolefin nano-composite materials, etc.

Further, there is also suggested a composite method performed in a liquid medium where resin is dispersed in a liquid medium, inorganic fine particles are further dispersed in the liquid medium and then the resin fine particles and the inorganic fine particles are flocculated (for example, see JP 2008-101049, JP 2007-119769, JP 2007-113010, JP 2005-232257 and JP 2006-089523).

On the other hand, in the field of optical material, as for an optical material having high permeability and high refractive index, change in linear expansion and refractive index due to temperature change is small, having excellent thermal stability and can replace glass, it is suggested to use a nano-composite material manufactured as described above. Such nano-composite material can improve refractive index and thermal stability as a raw material (for example, see JP 2009-084459).

With respect to a raw material of an optical material, it is required that a so-called nano-inorganic fine particles whose average particle diameter is 30 nm or smaller are evenly dispersed in a resin in order to obtain expected transparency and homogeneity as an optical material.

However, nano-inorganic fine particles are generally unstably dispersed and easily flocculated in resin, polymerizable monomer and liquid medium. Therefore, in a case where any of the above methods is used, it is extremely difficult to prevent flocculation of nano-inorganic fine particles when nano-inorganic fine particles are contained at high concentration.

Thus, in the above described conventional methods, it is difficult to prevent nano-inorganic particles from re-flocculating at the time of forming a composite by kneading and mixing and at the time of forming a composite by cast polymerization. When nano-inorganic fine particles are to be contained in a resin at a high concentration to obtain excellent refraction index and thermal stability, it is difficult to sufficiently disperse the nano-inorganic fine particles. Further, in the Hot Melt Extrusion, kneading and mixing need to be continued for a long time at a high temperature that allows sufficiently low resin viscosity in order to improve dispersibility of the nano-inorganic fine particles. However, under such kneading and mixing condition, it is difficult to prevent the resin from going through thermal decomposition, and the color of the obtained resin changes to yellow leading to a problem that an expected optical properties cannot be obtained.

SUMMARY OF THE INVENTION

In view of the above problems, an object of the present invention is to provide a manufacturing method of an organic-inorganic composite material where inorganic fine particles are dispersed in a resin with high dispersibility being prevented from flocculating.

Further, another object of the present invention is to provide an optical material that assures high transparency due to inorganic fine particles being dispersed in a resin with high dispersibility while having high refraction index and thermal stability.

According to a first aspect of the present invention, there is provided a manufacturing method of an organic-inorganic composite material including a flocculation and fusion step to flocculate and fuse composite particles in a liquid medium, the composite particles being formed by inorganic fine particles being coated by coating layers.

Preferably, an average particle diameter of the inorganic fine particles is 1 nm or larger and 30 nm or smaller.

Preferably, the composite particles are obtained by dispersing the inorganic fine particles in the liquid medium in which a polymerizable monomer for forming a resin which forms the collating layers is dissolved or dispersed and polymerizing the polymerizable monomer under the existence of the inorganic fine particles to generate the resin.

Preferably, the resin forming the coating layers contains an organic acid group.

Preferably, the organic acid group is a carboxy group.

Preferably, the liquid medium contains an anionic surfactant and/or a nonionic surfactant.

Preferably, in the flocculation and fusion step, the composite particles are flocculated by adding a flocculant of an organic salt and/or an inorganic salt in the liquid medium in which the composite particles are dispersed.

Preferably, in the flocculation and fusion step, the composite particles are fused by raising a temperature to a glass transition point of the resin forming the coating layers or higher.

According to another aspect of the present invention, there is provided an optical material using the organic-inorganic composite material obtained by the above described manufacturing method of the organic-inorganic composite material as a raw material.

In the above described manufacturing method of the organic-inorganic composite material, preferably, the inorganic fine particles are aluminum oxide, zirconium oxide or lithium niobate. Still another aspect of the present invention provides an optical material comprising the organic-inorganic composite material obtained by such manufacturing method of the organic-inorganic composite material as a raw material.

In the above described manufacturing method of the organic-inorganic composite material, preferably, the resin forming the coating layers is a copolymer resin using a monomer having an aliphatic polycyclic hydrocarbon skeletal structure as a polymerizable monomer. Still another aspect of the present invention provides an optical material comprising the organic-inorganic composite material obtained by such manufacturing method of the organic-inorganic composite material as a raw material.

BRIEF DESCRIPTION OF THE DRAWINGS

The above and other objects, advantages and features of the present invention will become more fully understood from the detailed description given hereinbelow and the added drawings which are given by way of illustration only, and thus are not intended as a definition of the limits of the present invention, and wherein:

FIG. 1A is a schematic view of composite particles, FIG. 1B is a schematic view of a flocculated particle body where composite particles are flocculated and FIG. 1C is a schematic view of a fused particle body where composite particles are fused.

DESCRIPTION OF THE PREFERRED EMBODIMENTS

Hereinafter, the present invention will be described in detail.
[Manufacturing Method of Organic-Inorganic Composite Material]

The manufacturing method of an organic-inorganic composite material of the present invention includes a step to flocculate and fuse composite particles in a liquid medium, each of the composite particles being formed by the surface of an inorganic particle being coated with a coating layer made of resin (hereinafter, also called "matrix resin").

In the present invention, since composite particles which are formed by the coating layers of matrix resin coating the surfaces of inorganic particles are flocculated and fused in a liquid medium, an organic-inorganic composite material where inorganic fine particles are dispersed with high dispersibility, prevented from flocculating, can be manufactured even in a case where inorganic fine particles are contained in the matrix resin at high concentration.

The reason why inorganic fine particles are dispersed in the matrix resin with high dispersibility is because re-flocculation of the inorganic fine particles due to excessive lowering of the resin viscosity and thermal decomposition of the resin are prevented. This is because it is expected that flocculation of the inorganic fine particles is prevented to a great extent and the composite particles are flocculated and fused under a mild temperature condition in a liquid medium, not in a high temperature, to make the coating layers thereof fuse with each other since composite particles each having a configuration where an inorganic fine particle is a core and a coating layer of matrix resin is formed on the surface thereof are dispersed in a liquid medium and inorganic fine particles are not directly dispersed in the liquid medium.

The organic-inorganic composite material obtained by the manufacturing method of the present invention can be applied as a raw material in all fields that can be expected to exhibit excellent advantage which can be obtained due to inorganic fine particles being dispersed in matrix resin with high dispersibility.

The organic-inorganic composite material obtained by the manufacturing method of the present invention can be used as a raw material for tubes, sheets, films, bars, fibers, packing, lining, sealing, electric wire coating, printed circuit boards, etc. Especially, materials where an organic-inorganic composite material manufactured by using inorganic fine particles whose average particle diameter is 30 nm or smaller is used as a raw material can be used advantageously as an optical material since it has excellent transparency.

Figure 1A:
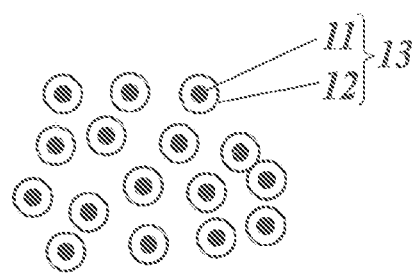
FIGS. 1A to 1C are schematic views for explaining a manufacturing method of an organic-inorganic composite material of the present invention.
Figure 1B:
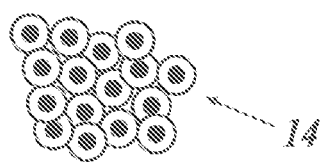
Figure 1C:
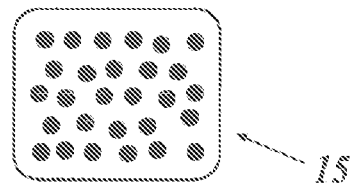

FIGS. 1A to 1C show specific examples of the manufacturing method of the organic-inorganic composite material of the present invention. As shown in FIGS. 1A to 1C, the manufacturing method includes (1) a preparation step of composite particle dispersed liquid wherein composite particles 13 are dispersed in a liquid medium, each of the composite particles 13 being formed by a coating layer 12 of matrix resin being formed on the surface of an inorganic fine particle 11, (2) an flocculation and fusion step where a flocculant is added to the liquid medium to flocculate the composite particles 13 and to grow a flocculated particle body 14 and to fuse the composite particles 13 to obtain a fused particle body 15, (3) a cleaning step to take out the fused particle body 15 from the liquid medium by filtration and remove the flocculant, flocculation terminator, surfactant, etc. from the fused particle body 15 and (4) a drying step to dry the cleaned fused particle body 15.

In the present invention, a liquid medium is an aqueous medium made of 50 to 100% by mass of water and 0 to 50% by mass of an aqueous organic medium. Any aqueous organic medium such as methanol, ethanol, isopropanol, butanol, acetone, methyl ethyl ketone, tetrahydrofuran, etc. can be used as long as it does not dissolve the matrix resin.

As for the liquid medium, water is preferably used since it has excellent environmental aptitude.
(1) Composite Particle Dispersed Liquid Preparation Step A dispersed liquid wherein composite particles are dispersed in a liquid medium (hereinafter, also referred to as "composite particle latex") can be prepared by a general emulsion polymerization, suspension polymerization or the like.

Especially, miniemulsion polymerization which is a type of emulsion polymerization is preferred for the preparation. In the miniemulsion polymerization, a matrix resin is generated by inorganic fine particles being dispersed in a liquid medium in which a polymerizable monomer for forming the matrix resin is dissolved or dispersed and by polymerizing the polymerizable monomer under the existence of the inorganic fine particles.

In particular, a polymerizable monomer liquid for forming a matrix resin is added to a liquid medium containing a surfactant at the critical micelle concentration (CMC) or lower and thereto, mechanical energy is applied to form droplets. Then, a water soluble radical polymerization initiator is added thereto to allow polymerization reaction proceed in the presence of inorganic fine particles in droplets. Here, an oil soluble polymerization initiator may be contained in the droplets.

As for the way to apply mechanical energy, methods of applying strong mixing or ultrasound vibration energy such as by a homomixer, ultrasound, Manton Gaulin, etc. can be suggested.

Further, all of the polymerizable monomer liquid does not have to be added when forming droplets, and only a certain partial amount of the polymerizable monomer liquid may be added when forming droplets. The rest may be added after the polymerization reaction has started.
[Surfactant]

In a case where a surfactant is to be contained in a liquid medium, it is preferred that an anionic surfactant and/or a nonionic surfactant is used as the surfactant.

As for an anionic surfactant, sulfonic acid salts such as sodium dodecyl benzenesulfonate, sodium arylalkyl polyethersulfonate, sodium 3,3-disulfondiphenylurea-4,4-diazo-bis-amino-8-naphthol-6-sulfonate, ortho-caroxybenzene-azo-dimethylaniline and sodium 2,2,5,5-tetramethyl-triphenylmethane-4,4-diazo-bis-β-naphthol-6-sulfonate; sulfuric acid ester salts such as sodium dodecylsulfate, sodium tetradecylsulfate, sodium pentadecylsulfate and sodium octylsulfate; and fatty acid salts such as sodium oleate, sodium laurate, sodium caprate, sodium caprylate, sodium caproate, potassium stearate and calcium oleate are suggested.

Further, as for a nonionic surfactant, polyethylene oxide, polypropylene oxide, a combination of polypropylene oxide and polyethylene oxide, ester formed from polyethylene glycol and a higher fatty acid, alkylphenol polyethylene oxide, ester formed from a higher fatty acid and polyethylene glycol, ester formed from a higher fatty acid and polypropylene oxide, and sorbitan ester are suggested.

With respect to these surfactants, one type alone may be used or a combination of two types or more may be used.

[Matrix Resin]

As for a matrix resin, general polycondensation resin and vinyl polymer resin can be used. As for the polycondensation resin, for example, polyester resin, polyamide resin, polyurethane resin, urea resin, phenoxy resin, polycarbonate resin, silicon resin, etc. are suggested. As for the vinyl polymer resin, for example styrene resin, acrylic resin, polyolefin resin, vinyl chloride resin, polyvinyl alcohol based resin, etc. are suggested. Moreover, a copolymer resin such as an acrylic styrene resin, for example, which is a combination of monomers forming the above resins may also be used. In view of obtaining desired performance and property, such copolymer resin is preferred to be used.

As for a matrix resin, it is preferred that an organic acid group such as carboxy group, sulfonic acid group, etc. is contained as an ionic dissociation group. In particular, by forming a matrix resin using a monomer containing the after-mentioned organic acid group, an organic acid group can be introduced in the matrix resin. By an organic acid group being contained in the matrix resin, the organic acid group is subject to ionic dissociation in the liquid medium and due to electric repulsion thereof, composite particles are easily stabilized in the liquid medium.

As for the matrix resin, it is preferred that an acrylic resin or an acrylic styrene resin which is a vinyl polymer resin is used in view of easiness of making an organic acid group be contained.

In a case where an acrylic styrene resin is used as a matrix resin, the following are suggested as the polymerization monomers that should form the matrix resin.

(1) Styrene and Styrene Derivatives

Styrene, o-methylstyrene, m-methy styrene, p-methylstyrene, α-methy styrene, p-chlorostyrene, 3,4-dichlorostyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, etc.

(2) Methacryl Acid Ester Derivative:

Methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl metacrylate, phenyl methacrylate, diethylaminoethyl methacrylate, dimethylaminoethyl methacrylate, etc.

(3) Acrylic Acid Ester Derivative:

Methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, phenyl acrylate, etc.

(4) Monomer Containing Organic Acid Group

Monomers containing carboxy group such as acrylic acid, methacrylic acid, maleic acid, itaconic acid, cinnamic acid, fumaric acid, maleic acid mono-alkyl ester and itaconic acid mono-alkyl ester, monomers containing sulfonate group such as styrenesulfonic acid, allylsufosuccinic acid and 2-acrylamido-2-methylpropane sulfonic acid, monomers containing phosphate group such as acid phosphooxyethyl methacrylate and 3-chloro-2-acid-phosphooxypropyl methacrylate, etc.

As for a monomer containing an organic acid group, it is preferred that a monomer containing carboxy group is used.

With respect to these monomers, one type alone may be used or a combination of two or more types may be used.

In a case where an organic-inorganic composite material is used as a raw material of an optical material, it is preferred that the matrix resin is, for example, a copolymer resin such as acrylic styrene resin. Especially, in view of optical properties, it is preferred that the matrix resin is a copolymer resin using monomers having an aliphatic polycyclic hydrocarbon skeletal structure as a polymerizable monomer.

As for a monomer having the aliphatic polycyclic hydrocarbon skeletal structure, compounds expressed by general formula (1) such as tricyclodecabe domethanol dimethacrylate, tricyclodecabe domethanol diacrylate, etc., compounds expressed by general formula (2) such as adamantyl methacrylate, adamantyl acrylate, etc. and compounds expressed by general formula (3) such as isobornyl methacrylate, isobornyl acrylate, vinylnorbornene, etc. as disclosed in JP 2009-221350, for example, are suggested.

[Inorganic Fine Particles]

As for inorganic fine particles, various functional particles such as fine particles having mechanic properties such as conductive property, magnetic property, abrasion resistance property, impact resistance property, etc., fine particles having properties with respect to heat such as heat deformation property, flame retardant property, etc. and fine particles having optical properties such as specific refractive index, reflection index, etc. can be used.

In particular, fine particles formed of oxides, hydroxides, carbonates, silicates, sulfates, nitrides, metals, carbons and composites of the above are suggested.

As specific examples of oxides, zirconium oxide, titanium oxide, stannous oxide, silica, alumina, magnesium oxide, antimony oxide, calcium oxide, ferrite, etc. are suggested.

As specific examples of hydroxides, calcium hydroxide, magnesium hydroxide, aluminum hydroxide, etc. are suggested.

As specific examples of carbonates, calcium carbonate, magnesium carbonate, barium carbonate, hydrotalcite, dawsonite, etc. are suggested.

As specific examples of silicates, calcium silicate, talc, clay, mica, montmorillonite, bentonite, activated clay, glass beads, etc. are suggested.

As specific examples of sulfates, barium sulfate, calcium sulfate, etc. are suggested.

As specific examples of nitrides, aluminum nitride, silicon nitride, boron nitride, etc. are suggested.

As specific examples of metals, gold, silver, platinum, copper, etc. are suggested.

As specific examples of carbons, carbon black, graphite, etc. are suggested.

With respect to these inorganic fine particles, one type alone may be used or a combination of two or more types may be used.

In a case where an organic-inorganic composite material is used as a raw material of an optical material, it is preferred to use oxides such as zinc oxide, aluminum oxide, zirconium oxide, hafnium oxide, niobium oxide, tantalum oxide, magnesium oxide, calcium oxide, strontium oxide, barium oxide, indium oxide, stannous oxide and lead oxide, complex oxides made of the above oxides such as lithium niobate, potassium niobate, lithium tantalite, aluminum magnesium oxide ($MgAl_2O_4$), etc.

Among the above, in view of having high transparency and high refractive index and having excellent thermal stability, aluminum oxide, zirconium oxide and lithium niobate are especially preferred.

As the inorganic fine particles, preferably inorganic fine particles whose average particle diameter is 100 nm or smaller are used, and more preferably, inorganic fine particles whose average particle diameter is 1 nm or more and 30 nm or smaller are used.

In a case where an organic-inorganic composite material is used as a raw material of an optical material, preferably inorganic fine particles whose average particle diameter is 30 nm or smaller, for example, are used, and more preferably inorganic fine particles whose average particle diameter is 20 nm or smaller are used.

A well-known surface treatment may be performed on the inorganic fine particles as needed. As for compounds that can be used in such surface treatment include organic silane coupling agents such as hexamethyldisilazane, trimethylethoxy-silane, trimethylmethoxysilane, trimethylsilyl chloride, methyltriethoxysilane, dimethyldiethoxysilane, N-Decyltrimethoxysilane, vinyl trichlorosilane, vinyltrimethoxysilane, vinyltriethoxysilane, N-(2-Aminoethyl)-3-aminopropyltriethoxysilane and 3-mercaptopropylmethyldimethoxysilane, organic carboxylic acid compounds such as butyric acid, isobutyric acid, methacrylic acid, hexanoic acid, octanoic acid, oleic acid, linoleic acid and lauric acid, isocyanate compounds having acryloyl group such as acryloyl isocyanate, methacryloyl isocyanate, acrylic acid 2-isocyanatoethyl ester, methacrylic acid 2-isocyanatoethyl ester, etc.

The surface treatment amount varies according to the type and the particle diameter of the inorganic fine particles used. However, preferably surface treatment amount is 0.1 folds to 10 folds with respect to the amount of inorganic fine particles, more preferably, 0.2 folds to 5 folds.

The amount of inorganic fine particles used with respect to the matrix resin varies according to the usage of the obtained organic-inorganic composite material. However, the amount of inorganic fine particles used is preferably 0.1 to 80% by mass to 100% by mass of composite particles, for example, and more preferably, 0.5 to 50% by mass, and even more preferably 1 to 30% by mass.

[Polymerization Initiator]

In a case where a polymerization initiator is used in the composite particle dispersed liquid preparation step, various well-known polymerization initiators can be used as a polymerization initiator.

As an oil soluble polymerization initiator, azo type or diazo type polymerization initiators such as 2,2'-azobis-(2,4-dimethylvaleronitrile), 2,2'-azobisisobutyronitrile, 1,1'-azobis-(cyclohexane-1-carbonitrile), and 2,2'-azobis-4-methoxy-2,4-dimethylvaleronitrile; peroxide type polymerization initiators such as benzoyl peroxide, methylethylketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; and polymer initiators having peroxide in side chains are suggested.

As a water soluble polymerization initiator, persulfate salts such as potassium persulfate and ammonium persulfate, azobisamidinopropane acetate, azobiscyanovaleric acid and salts thereof, and hydrogen peroxide are suggested.

With respect to these polymerization initiators, one type alone may be used or a combination of two or more types may be used.

The average particle diameter of the composite particles obtained by the composite particle dispersed liquid preparation step varies according to the average particle diameter of the inorganic fine particles which are the cores. However, it is preferred that the average particle diameter of the obtained composite particles is 500 nm or smaller according to the volume-base median size, and more preferably, 50 nm or larger and 200 nm or smaller.

The volume-base median diameter of the composite particles is measured by using "Microtrac UPA150" (available from NIKKISO CO., LTD).

(2) Flocculation and Fusion Step

In the flocculation and fusion step, fused particle bodies are formed by flocculating the composite particles in the liquid medium and fusing the composite particles.

As for the flocculation method of the composite particles in the liquid medium, for example, the following methods (1) to (3) are suggested.

(1) A method using the salting-out flocculation where a flocculant made of an organic salt and/or an inorganic salt is added to the liquid medium to change the electric repulsion of the composite particles to make the composite particle latex be unstable and thereby the composite particles are flocculated.

(2) A method where pH of the liquid medium is controlled to change the electric repulsion to make the composite particle latex unstable and thereby the composite particles are flocculated.

(3) A method where, if the composite particle latex contains a nonionic surfactant, the liquid medium is heated to the clouding point of the nonionic surfactant or higher to diminish or vanish the emulsification of the nonionic surfactant and thereby the composite particles are flocculated.

Here, dispersion of the composite particles in the composite particle latex is stabilized due to the electric repulsion caused by ionic dissociation of the organic acid of the matrix resin and due to emulsification of the surfactant contained in the composite particle latex.

With respect to flocculation of the composite particles, it is preferred to control the flocculated particle bodies in a growth process so as to have an even and stable configuration and composition. So-called rapid flocculation where the composite particles grow into a large flocculated particle body mass needs to be prevented.

Therefore, among the above methods (1) to (3), the method (1) using the salting-out flocculation is preferably used since the level of flocculation can be controlled easily in this method. Further, in the salting-out flocculation where the composite particles are flocculated under the condition where temperature and shearing stress (stirring speed) are controlled while stirring the composite particle latex, it is preferred that the flocculation is controlled according to a combination of conditions of pH, temperature and shearing stress.

The salting-out flocculation is a method where a flocculant is added to a composite particle latex at the critical aggregation concentration or greater and the composite particle latex to which the flocculant is added is heated to the glass transition point of the matrix resin or higher to allow the composite particles proceed with salting-out, and to allow the composite particles proceed with fusing to grow flocculated particle bodies at the same time.

In order to control the level of flocculation, a surfactant or the like may be further added to the composite particle latex. As for a surfactant, the above mentioned anionic surfactants and nonionic surfactants are suggested.

Pure water may be added to the composite particle latex as needed in order to adjust the concentration of the composite particle latex and the concentration of the flocculant.

In order to control the electric repulsion caused by ionic dissociation of the organic acid group in the matrix resin, it is preferred to adjust pH of the composite particle latex. In particular, in a case where the organic acid group is an anionic group, it is preferred to make pH of the liquid medium be alkaline in order to facilitate ionic dissociation and stabilize the composite particle latex.

[Flocculants]

As for a flocculant, flocculants made of organic salts and inorganic salts can be used.

As for organic salts, salts of alkaline metals of multivalent organic acid such as potassium gluconate or sodium gluconate, potassium citrate or sodium citrate, potassium tartrate or sodium tartrate, potassium malate or sodium malate, etc. are suggested.

As for inorganic salts, metal salts of alkaline metals such as lithium, potassium and sodium, metal salts of alkali earth metals such as magnesium, calcium, strontium and barium, metal salts of trivalent metals such as aluminum are suggested. In particular, sodium chloride, sodium bromide, sodium iodide, potassium chloride, potassium bromide, magnesium chloride, magnesium bromide, calcium chloride, aluminum chloride, etc. are suggested.

With respect to these flocculants, one type may be used alone or a combination of two type or more may be used.

The flocculants may be added as the solid form or as in the form of aqueous solution.

With respect to the flocculants, their critical flocculation concentration greatly varies according to their ionic valence, and their cohesive force also varies. In particular, the greater the ionic valence, the higher the cohesive force. That is, cohesive force is higher in bivalent than in monovalent, cohesive force is higher in trivalent than in bivalent, for example. Therefore, it is preferred that flocculants are suitably selected on the basis of the components of the composite particle latex.

The temperature of the composite particle latex when a flocculant is to be added is at the glass transition point of the matrix resin or lower, generally between 0 and 55 degrees, preferably, between 10 and 35 degrees.

If the temperature of the composite particle latex when the flocculant is to be added is higher than the glass transition point of the matrix resin, although salting-out and flocculation of the composite particles will proceed rapidly, it is difficult to control the particle diameter of the flocculated particle bodies, and there is a possibility that large flocculated particle bodies are formed.

It is preferred that the time period to let the liquid sit after the flocculant is added be short as possible. This is because during the time period the liquid is left as it is after the salting-out, the particle condition of the flocculated particle bodies changes leading to unstable particle size dispersion and also the surface property of the flocculated particle bodies changes.

Therefore, it is preferred that temperature starts to raise right after the flocculant is added and is heated to the glass transition point of the matrix resin or higher.

The preferred temperature raising speed is 0.25 degrees/minute to 5 degrees/minute. If the temperature raising speed is too fast, there is a problem that it is difficult to control the particle diameter of the flocculated particle bodies due to the salting-out proceeding rapidly.

When the temperature reached the desired temperature and when the temperature is stabilized, it is preferred that the stirring speed of the reaction tank which has been stirring at high speed is dropped to perform salting-out and flocculation in a state where the shearing stress is lowered. By performing salting-out and flocculation in a state where the shearing stress is lowered, rapid flocculation can be prevented and slow flocculation can be performed. As a result, fused particle bodies with even particle diameters can be obtained.

Several methods can be suggested as the composite particle fusion method. However, it is preferred to use a method where the surfaces of the coating layers are softened by heating to the temperature of the glass transition point of the matrix resin or higher, and then hardened and integrated. In reality, since the temperature is raised to the glass transition point or higher when performing flocculation of the composite particles in the flocculation and fusion step, the flocculation and the fusion are performed at the same time.

Moreover, as another composite particle fusion method, a method where composite particles are fused by the cross-linking reaction of a reactive group in the flocculated particle bodies can be used if the matrix resin includes a reactive group which causes chemical bonding.

As for a reactive group which causes chemical bonding, vinyl group, hydroxyl group, amino group, mercapto group, carboxylic acid group, sulfonate group, isocyanate group, etc. are suggested. Among these, vinyl group is especially preferred. With respect to the cross-linking reaction by a vinyl group, it is preferred that the cross-linking reaction takes place by being irradiated by ultraviolet light under the existence of a photopolymerization initiator which generates radical due to ultraviolet light. The function of a photopolymerization initiator can be incorporated in the matrix resin in advance. In particular, as for the matrix resin, a resin including a reactive group which generates radical due to ultraviolet light is to be used.

After the flocculated particle bodies grow to a desired size, it is preferred to stop the growing of the flocculated particle bodies by increasing the searing stress by increasing the stirring speed. Then, in a state where the temperature at the time of flocculation is maintained or where the temperature is raised even higher, the composite particles are solidified and integrated by continuing with the high speed stirring. Thereby, fused particle bodies are obtained.

As for a method to stop the growing of the flocculated particle bodies, a method where a salt whose critical flocculation concentration is different from that of the flocculant used and whose flocculation force is weak is added as a flocculation terminator is suggested. For example, if bivalent magnesium salt is used as the flocculant, monovalent sodium salt can be used as the flocculation terminator.

In the flocculation and fusion step, the composite particles may be flocculated and fused under the existence of other additives in the liquid medium. By performing flocculation and fusion under the existence of other additives, the other additives can be contained in the fused particle body.

As for the other additives, color materials such as pigment, stabilizers such as antioxidant, ultraviolet absorber, light stabilizer and anti-static agent, etc. are suggested.

With respect to the average particle diameter of the fused particle bodies, it is preferred that the average particle diameter is between 10 μm and 1 mm according to the volume-base median diameter, and it is also preferred that the particle diameters are even. Due to the average particle diameter of fused particle bodies being within the above range, cleaning and drying can be carried out easily.

The average particle diameter of fused particle bodies can be controlled according to a combination of the concentration and adding amount of the flocculant used in the manufacturing, the fusing time period and the matrix resin composition, for example.

The volume-base median diameters of the fused particle bodies are measured with "Multisizer 3" (available from Beckman Coulter, Inc.).

Cooling treatment is performed on the fused particle body dispersed liquid prepared as described above.

Cooling treatment of the fused particle body dispersed liquid is performed by cooling (quenching) the dispersed liquid to the temperature of glass transition point of the matrix resin, which forms the coating layers of composite particles, or lower.

As for the cooling condition, it is preferred to perform cooling at the cooling speed of 1 to 20 degrees/min.

Cooling method is not specifically limited, and a method of cooling by introducing a refrigerant from outside the reaction tank, a method or cooling by pouring cold water directly in the reaction system are suggested.

(3) Cleaning Step

In the cleaning step, first, a solid-liquid separation treatment where fused particle bodies are separated in the cooled fused particle body dispersed liquid and a cleaning treatment where additives such as a surfactant and flocculant are removed from cakes (fused particle bodies in wet state) which are separated from the liquid are performed.

As for the solid-liquid separation treatment, centrifugation, filtration under reduced pressure using Nutsche, filtering using filter press, etc. are suggested.

As for the cleaning treatment, a batch cleaning where the wet cakes are dispersed and stirred again in a cleaning solution in the tank and then filtered, a continuous cleaning where cleaning is performed by filtering under reduced pressure while continuously pouring a cleaning solution to the cakes, etc. are suggested. Generally, it is preferred that water is used to clean in the cleaning treatment. However, an organic solution or a mixed solution of water and organic solution may be used as needed.

(4) Drying Step

In the drying step, the cleaned wet cakes are dried and a granular body made of organic-inorganic composite material (hereinafter, also referred to as "composite material granular body") is obtained.

As for the drying machine used for the drying, a heated-air dryer, a vacuum freeze dryer, a vacuum dryer, etc. are suggested. It is preferred to use a ventilation shelf dryer, a portable shelf dryer, a fluidized-bed dryer, a rotary dryer, an agitated dryer or the like.

With respect to the drying temperature, a temperature lower than the melting point, the deformation temperature and the decomposition temperature of the matrix resin and which can realize sufficient drying efficiency can be selected.

It is preferred that the moisture in the dried composite material granular body is 5% by mass or lower, and more preferably, 2% by mass or lower.

In a case where the particles of the dried composite material granular body are flocculated by weak attraction between the particles, such flocculated body may be crushed. As for the crushing device, a mechanical crushing device such as a jet mill, Henshel mixer, a coffee mill, a food processor or the like can be used.

[Composite Material Granular Body]

The composite material granular body obtained as described above can be made into pellets by a normal melt extruder and can be melt molded such as extrusion molding, injection molding, transfer molding, etc. Further, the composite material granular body may be a molding raw material as it is without making it into pellets. Furthermore, the composite material granular body which is solidified by using a compacter may be subject to melt molding using a hopper of a molding machine.

If the composite material granular body is made into pellets by a melt extruder, in view of searing stress, it is preferred to use a twin screw extruder. By changing the screw configuration and rotation speed of the twin screw extruder, dispersion of the inorganic fine particles in the matrix resin can be improved even more. However, melt blending by the twin screw extruder is not required for improving the dispersion of inorganic fine particles.

Further, in the process of making the composite material granular body into pellets by a melt extruder, additives may be added as desired and other resin can be blended.

With respect to the composite material granular body, the pellets made of the composite material granular body and the molded body obtained by the pellets being melt processed, the dispersion state of inorganic fine particles dispersed in the matrix resin is approximately the same. The good dispersion in the composite material granular body is also exhibited in the finally obtained molded body.

According to the above described manufacturing method of organic-inorganic composite material, since composite particles, which are formed by inorganic fine particles being coated by coating layers of matrix resin, are flocculated and fused in a liquid medium, flocculation of the inorganic fine particles can be controlled even if the inorganic fine particles are contained in the matrix resin at high concentration, and an organic-inorganic composite material in which inorganic fine particles are dispersed with high dispersibility can be manufactured.

[Optical Material]

The optical material of the present invention is obtained by using the organic-inorganic composite material obtained by the above described organic-inorganic composite material manufacturing method as a raw material.

According to such optical material, while assuring the high refractive index and thermal stability by containing inorganic fine particles in the matrix resin at high concentration, the inorganic fine particles are dispersed with high dispersibility assuring high transparency.

Although embodiments of the present invention are specifically described above, embodiments of the present invention are not limited to the examples described above and various changes can be made.

Embodiment Example

Hereinbelow, specific examples of the present invention will be described. However, they are not limitative in any way.

Embodiment Example 1

Organic-Inorganic Composite Material Manufacturing Example 1

(1) Hydrophobization Treatment of Inorganic Fine Particles

To 25 g of alumina nanoparticles (particle diameter is 10 nm), 500 mL pyridine was added and dispersed for two hours by the Ultra Apex Mill. Then, 100 g of trimethylsilyl chloride was dropped, in the form of droplets, in to the above obtained dispersed liquid over the duration of one hour while being stirred, and further stirred for one more hour. Thereafter, particles were separated by centrifugation, and 100 mL of ethanol was added to the particles to clean them by repeating the stirring and separation by centrifugation for four times. The obtained particles were dried over one night at the temperature of 100 degrees to obtain alumina nanoparticles [A-1] whose surfaces are now hydrophobic through the hydrophobization treatment using a trimethylsilyl group.

(2) Preparation of Composite Particle Latex where the Composite Particles are Made by Inorganic Fine Particles being Coated with a Resin As a polymerizable monomer for forming resin, 70 g of butylacrylate, 120 g of dicyclopentanyl methacrylate and 10 g of methacrylic acid are prepared. To 40 g of alumin nanoparticles [A-1], 10% by mass of the prepared polymerizable monomer is added and dispersed by a Labo Plasto Mill to obtain a mixture. To the obtained mixture, 40 g of 10% aqueous solution of an anionic surfactant "EMAL 2FG" (available from Kao Corporation) and 920 g of pure water are added and emulsified and dispersed by the emulsification/dispersion device "Cleamix" (available from M Technique Co. Ltd.) to obtain an emulsion/dispersion liquid. Under a nitrogen gas stream, the obtained emulsion/dispersion liquid was stirred, heated to 75 degrees and maintained at this temperature, and then, 0.8 g of potassium persulphate was added as a polymerization catalyst to cause a reaction. After 20 minutes, 90% by mass of the polymerization monomer which is the rest of the prepared polymerization monomer is dropped, in the form of droplets, therein over the duration of 1.5 hours, and then, a reaction was allowed to continue for two hours at the same temperature to perform miniemulsion polymerization. After the polymerization reaction and after cooling it down to below room temperature, the stirring was stopped and the composite particle latex [B-1] was obtained. In the composite particle latex [B-1], the particle diameter of the composite particles was 90 nm and the glass transition point was 56 degrees.

(3) Flocculation and Fusion of Fine Particles in Composite Particle Latex

In a reaction tank, 1200 g of the composite particle latex [B-1] (solid content conversion 240 g) and 1200 g of pure water were put in and the liquid temperature was adjusted to be at 30 degrees. Then, sodium hydroxide aqueous solution was added to adjust pH to 10.0. Next, 30 g of 50% magnesium chloride solution was dropped, in the form of droplets, as a flocculant under stirring at 280 rpm. Thereafter, the temperature was raised to 80 degrees over the duration of 60 minutes and then, the stirring speed was decreased to 100 rpm while maintaining the liquid temperature at 70 degrees and a particle growth reaction was caused. When the particle diameter of the aggregate reached 100 μm, the stirring speed was returned to 280 rpm and 800 g of 20% sodium chloride solution was added to stop the particle growth. Further, as the fusion step, the liquid temperature was raised to 90 degrees and heating and stirring was continued form two hours, and then it was cooled and stirring was stopped.

The generated fused particle bodies were filtered under reduced pressure by a Nutsche and wet cakes were obtained. To these wet cakes, 1000 g of pure water was added again and was stirred and dispersed again, and then, the particle bodies were filtered under reduced pressured by a Nutsche. Such cleaning using 1000 g of pure water was repeated for three times and the obtained cleaned wet cakes were shelf dried by a fan drying machine at 40 degrees. By continuing the drying until the moisture is 1.0% by mass or lower, the granular body [C-1] of particles made of organic-inorganic composite material is obtained.

Embodiment Example 2

Organic-Inorganic Composite Material Manufacturing Example 2

(1) Preparation of Composite Particle Latex where the Composite Particles are Made by Inorganic Fine Particles being Coated with a Resin In a liquid of 200 g of zirconia-sol water dispersed liquid (particle diameter is 15 nm, solid content is 20%) and 300 g of pure water, 3.0 g of the reactive nonionic surfactant "Adekariasoap NE-10" (available from ADEKA Corporation) was added under stirring and under a nitrogen gas stream at the room temperature. Then, as a polymerizable monomer for forming resin, 5% by mass of the monomer mixture of 40 g of butylacrylate, 140 g of isobonyl methacrylate and 20 g of methacrylic acid was dropped therein, in the form of droplets, over the duration of 10 minutes and then, the mixture liquid was heated to 70 degrees and 100 g of 10% aqueous solution of the anionic surfactant "EMULGEN E-27C" (available from Kao Corporation) and 0.6 g of potassium persulphate as a polymerization catalyst were added. Thereafter, 95% by mass of the monomer mixture which is the rest of the monomer mixture was dropped therein, in the form of droplets, over the duration of four hours at the same temperature and then, the polymerization reaction was allowed to continue from one hour at 70 degrees. After the polymerization reaction and after cooled down to below room temperature, the stirring was stopped and the composite particle latex [B-2] was obtained. In the composite particle latex [B-2], the particle diameter of the composite particles was 75 nm and the glass transition point was 70 degrees.

(2) Flocculation and Fusion of Fine Particles in Composite Particle Latex

In a reaction tank, 800 g of the composite particle latex [B-2] (solid content conversion 240 g), 1000 g of pure water and 2 g of the nonionic surfactant "EMULGEN 1135S" were put in and the liquid temperature was adjusted to be at 30 degrees. Then, sodium hydroxide aqueous solution was added to adjust pH to 10.0. Next, 20 g of 50% magnesium chloride solution was dropped therein, in the form of droplets, as a flocculant at the same temperature. Thereafter, the temperature was raised to 80 degrees and the stirring speed was decreased to 100 rpm while maintaining the same temperature and a particle growth reaction was caused. When the particle diameter of the flocculated particle bodies reached 100 μm, the stirring speed was returned to 280 rpm and 500 g of 20% sodium chloride solution was added to stop the particle growth. Further, as the fusion step, the liquid temperature was raised to 95 degrees and heating and stirring was continued for three hours, and then it was cooled and stirring was stopped.

The generated fused particle bodies were filtered under reduced pressure by a Nutsche and wet cakes were obtained. To these wet cakes, 1000 g of pure water was added again and was stirred and dispersed again, and then, the particle bodies were filtered under reduced pressured by a Nutsche. Such cleaning using 1000 g of pure water was repeated for three times and the obtained cleaned wet cakes were shelf dried by a fan drying machine at 40 degrees. By continuing the drying until the moisture is 1.0% by mass or lower, the granular body [C-2] of particles made of organic-inorganic composite material was obtained.

Embodiment Example 3

Organic-Inorganic Composite Material Manufacturing Example 3

(1) Hydrophobization Treatment of Inorganic Fine Particles

To 1.00 g of zirconia-sol water dispersed liquid (particle diameter is 15 nm, solid content is 20%), 500 mL of ethanol, 100 mL of toluene and 10 g of n-octane-carboxylic acid were added and stirred and mixed for two hours. Thereafter, the solvent was removed and the obtained particles were dried over one night at 100 degrees to obtain the zirconia nanoparticles [A3] whose surfaces are now hydrophobic through the hydrophobization treatment using a n-octane-carboxylic acid group.

(2) Preparation of Composite Particle Latex where the Composite Particles are Made by Inorganic Fine Particles being Coated with a Resin As a polymerizable monomer for forming resin, 80 g of 2-ethylhexyl methacrylate, 100 g of isobonyl methacrylate and 20 g of methacrylic acid were prepared. To 40 g of zirconia nanoparticles [A-3], 5% by mass of the prepared polymerizable monomer was added and dispersed by a Labo Plasto Mill to obtain a mixture. To the obtained mixture, 40 g of 10% aqueous solution of the anionic surfactant "EMAL 2FG" (available from Kao Corporation) and 920 g of pure water were added and emulsified and dispersed by the emulsification/dispersion device "Cleamix" (available from M Technique Co. Ltd.) to obtain an emulsion/dispersion liquid. Under a nitrogen gas stream, the obtained emulsion/dispersion liquid is stirred, heated to 75 degrees and maintained at this temperature, and then, 0.8 g of potassium persulphate was added as a polymerization catalyst to cause a reaction. After 20 minutes, 95% by mass of the polymerization monomer which is the rest of the prepared polymerization monomer was dropped therein, in the form of droplets, over the duration of 1.5 hours, and then, the reaction was allowed to continue for two hours at the same temperature to perform miniemulsion polymerization. After the polymerization reaction and after cooling down to below room temperature, stirring was stopped and the composite particle latex [B-3] was obtained. In the composite particle latex [B-3], the particle diameter of the composite particles was 83 nm and the glass transition point was 73 degrees.

(3) Flocculation and Fusion of Fine Particles in Composite Particle Latex

In a reaction tank, 1200 g of the composite particle latex [B-3] (solid content conversion 240 g) and 1200 g of pure water were put in and the liquid temperature was adjusted to be at 30 degrees. Then, sodium hydroxide aqueous solution was added to adjust pH to 9.0. Next, 10 g of 10% poly aluminum chloride solution was dropped therein, in the form of droplets, as a flocculant at the same temperature under stirring at 280 rpm. Thereafter, the temperature was raised to 70 degrees over the duration of 60 minutes and then, the stirring speed was decreased to 150 rpm while maintaining the liquid temperature at 70 degrees and a particle growth reaction was caused. When the particle diameter of the flocculated particle bodies reached 100 μm, the stirring speed was returned to 280 rpm and 800 g of 20% sodium chloride solution was added to stop the particle growth. Further, as the fusion step, the liquid temperature was raised to 95 degrees and heating and stirring was continued form two hours, and then it was cooled and stirring was stopped.

The generated fused particle bodies were filtered under reduced pressure by a Nutsche and wet cakes were obtained. To these wet cakes, 1000 g of pure water was added again and was stirred and dispersed again, and then, the particles were filtered under reduced pressured by a Nutsche. Such cleaning using 1000 g of pure water was repeated for three times and the obtained cleaned wet cakes were shelf dried by a fan drying machine at 40 degrees. By continuing the drying until the moisture is 1.0% by mass or lower, the granular body [C-3] of particles made of organic-inorganic composite material was obtained.

Embodiment Example 4

Organic-Inorganic Composite Material Manufacturing Example 4

(1) Hydrophobization Treatment of Inorganic Fine Particles

To 100 g of zirconia-sol MEK (methyl ethyl ketone) dispersed liquid (particle diameter is 7 nm, solid content is 20%), 20 g of methacrylic acid 2-isocyanatoethyl ethyl and 20 mg of dibutyltin dilaurate were added and stirred and mixed for 24 hours. Then, 3 g of isopropanol was added to the reaction liquid and stirred and mixed for three hours to inactivate the excess isocyanate. Thereafter, the solvent was removed and the obtained particles were dried over one night at 30 degrees to obtain the zirconia nanoparticles [A-4] whose surfaces are now hydrophobic through the hydrophobization treatment using an isocyanate group.

(2) Preparation of Composite Particle Latex where the Composite Particles are Made by Inorganic Fine Particles being Coated with a Resin As a polymerizable monomer for forming resin, 380 g of styrene, 140 g of cyclohexyl methacrylate and 30 g of acrylic acid were prepared. To 40 g of zirconia nanoparticles [A-4], 5% by mass of the prepared polymerizable monomer was added and dispersed by a Labo Plasto mill to obtain a mixture. To the obtained mixture, 50 g of 10% aqueous solution of the anionic surfactant "EMULGEN E-27C" (available from Kao Corporation) and 920 g of pure water were added and emulsified and dispersed by the emulsification/dispersion device "Cleamix" (available from M Technique Co. Ltd.) to obtain an emulsion/dispersion liquid. Under a nitrogen gas stream, the obtained emulsion/dispersion liquid was stirred, heated to 75 degrees and maintained at this temperature, and then, 1.0 g of potassium persulphate was added as a polymerization catalyst to cause a reaction. After 15 minutes, 95% by mass of the polymerization monomer which is the rest of the prepared polymerization monomer was dropped therein, in the form of droplets, over the duration of 1.5 hours, and then, the reaction was allowed to continue for two hours at the same temperature to perform miniemulsion polymerization. After the polymerization reaction and after cooling down to below room temperature, stirring was stopped and the composite particle latex [B-4]

was obtained. In the composite particle latex [B-4], the particle diameter of the composite particles was 72 nm and the glass transition point was 81 degrees.

(3) Flocculation and Fusion of Fine Particles in Composite Particle Latex

In a reaction tank, 1200 g of the composite particle latex [B-4] (solid content conversion 240 g) and 1200 g of pure water were put in and the liquid temperature was adjusted to be at 30 degrees. Then, sodium hydroxide aqueous solution was added to adjust pH to 11.0. Next, 50 g of 40% calcium chloride solution was dropped therein, in the form of droplets, as an aggregation agent under stirring at 280 rpm. Thereafter, the temperature was raised to 90 degrees over the duration of 60 minutes and then, the stirring speed was decreased to 120 rpm while maintaining the liquid temperature at 90 degrees and a particle growth reaction was caused. When the particle diameter of the flocculated particle bodies reached 100 μm, the stirring speed was returned to 280 rpm and 800 g of 20% sodium chloride solution was added to stop the particle growth. Further, as the fusion step, the liquid temperature was raised to 98 degrees and heating and stirring was continued for two hours, and then it was cooled and stirring was stopped.

The generated fused particle bodies were filtered under reduced pressure by a Nutsche and wet cakes were obtained. To these wet cakes, 1000 g of pure water was added again and was stirred and dispersed again, and then, the particles were filtered under reduced pressured by a Nutsche. Such cleaning using 1000 g of pure water was repeated for three times and the obtained cleaned wet cakes were shelf dried by a fan drying machine at 40 degrees. By continuing the drying until the moisture is 1.0% by mass or lower, the granular body [C-4] of particles made of organic-inorganic composite material was obtained.

Embodiment Example 5

Organic-Inorganic Composite Material Manufacturing Example 5

(1) Hydrophobization Treatment of Inorganic Fine Particles

To 20 g of lithium niobate particles (particle diameter is 12 nm), 250 mL of methyl ethyl ketone and 4 g of vinyltrimethoxysilane were added and dispersed for four hours by the Ultra Apex Mill. Thereafter, particles were separated by centrifugation, and 100 mL of ethanol was added to the particles to clean them by repeating the stirring and separation by centrifugation for four times. The obtained particles were dried over one night at the temperature of 100 degrees to obtain lithium niobate particles [A-5] whose surfaces are now hydrophobic through the hydrophobization treatment using a vinylsilyl group.

(2) Preparation of Composite Particle Latex where the Composite Particles are Made by Inorganic Fine Particles being Coated with a Resin As a polymerizable monomer for forming resin, 30 g of butylacrylate, 150 g of isobornyl acrylate and 20 g of methacrylic acid were prepared. To 40 g of lithium niobate particles [A-5], 10% by mass of the prepared polymerizable monomer was added and dispersed by a Labo Plasto Mill to obtain a mixture. To the obtained mixture, 40 g of 10% aqueous solution of the anionic surfactant "EMAL 2FG" (available from Kao Corporation) and 920 g of pure water were added and emulsified and dispersed by the emulsification/dispersion device "Cleamix" (available from M Technique Co. Ltd.) to obtain an emulsion/dispersion liquid. Under a nitrogen gas stream, the obtained emulsion/dispersion liquid was stirred, heated to 75 degrees and maintained at this temperature, and then, 0.8 g of potassium persulphate was added as a polymerization catalyst to cause a reaction. After 30 minutes, 90% by mass of the polymerization monomer which is the rest of the prepared polymerization monomer is dropped therein, in the form of droplets, over the duration of 1.5 hours, and then, the reaction was allowed to continue for two hours at the same temperature to perform miniemulsion polymerization. After the polymerization reaction and after cooling down to below room temperature, stirring was stopped and the composite particle latex [B-5] was obtained. In the composite particle latex [B-5], the particle diameter of the composite particles was 87 nm and the glass transition point was 68 degrees.

(3) Flocculation and Fusion of Fine Particles in Composite Particle Latex

In a reaction tank, 1200 g of the composite particle latex [B-5] (solid content conversion 240 g) and 1200 g of pure water were put in and the liquid temperature was adjusted to be at 30 degrees. Then, sodium hydroxide aqueous solution was added to adjust pH to 10.0. Next, 30 g of 20% trisodium citrate solution was dropped therein, in the form of droplets, as a flocculant under stirring at 280 rpm. Thereafter, the temperature was raised to 80 degrees over the duration of 60 minutes and then, the stirring speed was decreased to 170 rpm while maintaining the liquid temperature at 80 degrees and a particle growth reaction was caused. When the particle diameter of the flocculated particle bodies reached 100 μm, the stirring speed was returned to 280 rpm and 800 g of 20% sodium chloride solution was added to stop the particle growth. Further, as the fusion step, the liquid temperature was raised to 95 degrees and heating and stirring was continued for two hours, and then it was cooled and stirring was stopped.

The generated fused particle bodies were filtered under reduced pressure by a Nutsche and wet cakes were obtained. To these wet cakes, 1000 g of pure water was added again and was stirred and dispersed again, and then, the particles were filtered under reduced pressured by a Nutsche. Such cleaning using 1000 g of pure water was repeated for three times and the obtained cleaned wet cakes were shelf dried by a fan drying machine at 40 degrees. By continuing the drying until the moisture is 1.0% by mass or lower, the granular body [C-5] of particles made of organic-inorganic composite material was obtained.

[Evaluation]

The above described granular bodies [C-1], [C-2], [C-3], [C-4] and [C-5] were respectively molded and optical testing plates (20 mm width×40 mm length×1.0 thickness) [C-1], [C-2], [C-3], [C-4] and [C-5] were prepared.

As the reference example 1 and the reference example 2, similar optical testing pates [D-1], [D-2], [D-3], [D-4] and [D-5] made of granular bodies [C-1], [C-2], [C-3], [C-4] and [C-5] which are formed only by the matrix resin and not by composites of inorganic fine particles and the matrix resin were prepared.

With respect to each of the optical testing plates [C-1], [C-2], [C-3], [C-4], [C-5], [D-1], [D-2], [D-3], [D-4] and [D-5], transmittance at wavelength 588 nm was measured by a spectrophotometer. Further, refractive index at wavelength 588 nm was measured in the sample temperature variation range of 10 degrees to 60 degrees by using an automatic refractometer. Furthermore, by using a thermomechanical measurement device, the linear expansion coefficient was measured in the sample temperature variation between 40 degrees to 100 degrees.

TABLE 1

| optical testing plate No. | transmittance | refractive index | linear expansion coefficient |
|---|---|---|---|
| Embodiment example 1 | [C-1] | 92% | 1.58 | $2.9 \times 10^{-5}$ |
| Reference example 1 | [D-1] | 95% | 1.54 | $6.6 \times 10^{-5}$ |
| Embodiment example 2 | [C-2] | 89% | 1.61 | $3.5 \times 10^{-5}$ |
| Reference example 2 | [D-2] | 95% | 1.55 | $6.9 \times 10^{-5}$ |
| Embodiment example 3 | [C-3] | 90% | 1.60 | $3.3 \times 10^{-5}$ |
| Reference example 3 | [D-3] | 95% | 1.55 | $6.8 \times 10^{-5}$ |
| Embodiment example 4 | [C-4] | 93% | 1.65 | $3.5 \times 10^{-5}$ |
| Reference example 4 | [D-4] | 95% | 1.59 | $6.7 \times 10^{-5}$ |
| Embodiment example 5 | [C-5] | 88% | 1.55 | $1.1 \times 10^{-5}$ |
| Reference example 5 | [D-5] | 93% | 1.54 | $6.7 \times 10^{-5}$ |

Although the present invention has been described and illustrated in detail, it is clearly understood that the same is by way of illustrated and example only and is not to be taken by way of limitation, the scope of the present invention being interpreted by terms of the appended claims.

The entire disclosure of Japanese Patent Application No. 2013-263701 filed on Dec. 20, 2013 including description, claims, drawings, and abstract are incorporated herein by reference in its entirety.

What is claimed is:

1. A manufacturing method of an organic-inorganic composite material comprising a flocculation and fusion step to flocculate and fuse composite particles in a liquid medium, the composite particles being formed by inorganic fine particles being coated by coating layers formed of a resin.

2. The manufacturing method of the organic-inorganic composite material of claim 1, wherein an average particle diameter of the inorganic fine particles is 1 nm or larger and 30 nm or smaller.

3. The manufacturing method of the organic-inorganic composite material of claim 1, wherein the composite particles are obtained by dispersing the inorganic fine particles in the liquid medium in which a polymerizable monomer for forming the resin which forms the coating layers is dissolved or dispersed and polymerizing the polymerizable monomer under the existence of the inorganic fine particles to generate the resin.

4. The manufacturing method of the organic-inorganic composite material of claim 1, wherein the resin forming the coating layers contains an organic acid group.

5. The manufacturing method of the organic-inorganic composite material of claim 4, wherein the organic acid group is a carboxy group.

6. The manufacturing method of the organic-inorganic composite material of claim 1, wherein the liquid medium contains an anionic surfactant and/or a nonionic surfactant.

7. The manufacturing method of the organic-inorganic composite material of claim 1, wherein in the flocculation and fusion step, the composite particles are flocculated by adding a flocculant of an organic salt and/or an inorganic salt in the liquid medium in which the composite particles are dispersed.

8. The manufacturing method of the organic-inorganic composite material of claim 1, wherein in the flocculation and fusion step, the composite particles are fused by raising a temperature to a glass transition point of the resin forming the coating layers or higher.

9. The manufacturing method of the organic-inorganic composite material of claim 1, comprising dispersing the composite particles in the liquid medium before the flocculation and fusion step.

10. An optical material comprising the organic-inorganic composite material obtained by the manufacturing method of the organic-inorganic composite material of claim 1 as a raw material.

11. The manufacturing method of the organic-inorganic composite material of claim 1, wherein the inorganic fine particles are aluminum oxide, zirconium oxide or lithium niobate.

12. An optical material comprising the organic-inorganic composite material obtained by the manufacturing method of the organic-inorganic composite material of claim 11 as a raw material.

13. The manufacturing method of the organic-inorganic composite material of claim 1, wherein the resin forming the coating layers is a copolymer resin using a monomer having an aliphatic polycyclic hydrocarbon skeletal structure as a polymerizable monomer.

14. An optical material comprising the organic-inorganic composite material obtained by the manufacturing method of the organic-inorganic composite material of claim 13 as a raw material.

* * * * *